US012780004B2

(12) United States Patent
Choi

(10) Patent No.: US 12,780,004 B2
(45) Date of Patent: Nov. 3, 2026

(54) CONTACT FORCE ADJUSTMENT APPARATUS FOR CONTACT BAR CAPABLE OF ADJUSTING HEIGHT OF DOG

(71) Applicant: PUMPKIN CO., LTD., Namyangju-si (KR)

(72) Inventor: Yong Gil Choi, Namyangju-si (KR)

(73) Assignee: PUMPKIN CO., LTD., Namyangju-si (KR)

( * ) Notice: Subject to any disclaimer, the term of this patent is extended or adjusted under 35 U.S.C. 154(b) by 382 days.

(21) Appl. No.: 18/587,870

(22) Filed: Feb. 26, 2024

(65) Prior Publication Data

US 2025/0196649 A1 Jun. 19, 2025

Related U.S. Application Data

(63) Continuation of application No. PCT/KR2023/021427, filed on Dec. 22, 2023.

(30) Foreign Application Priority Data

Dec. 19, 2023 (KR) ........................ 10-2023-0186361

(51) Int. Cl.
*B60L 5/42* (2006.01)

(52) U.S. Cl.
CPC ...................................... *B60L 5/42* (2013.01)

(58) Field of Classification Search
CPC ...... B60L 5/00; B60L 5/18; B60L 5/19; B60L 5/22; B60L 5/24; B60L 5/28
See application file for complete search history.

(56) References Cited

FOREIGN PATENT DOCUMENTS

KR 20230095220 A * 6/2023 ................ B60L 5/24
KR 10-2561273 B1 7/2023

* cited by examiner

*Primary Examiner* — Robert J McCarry, Jr.
(74) *Attorney, Agent, or Firm* — NKL LAW; Jae Youn Kim

(57) ABSTRACT

Provided relates to a contact force adjustment apparatus for a contact bar, which includes a height adjustment unit that varies a height of a dog detected by a photosensor, a tension checking unit capable of easily checking a change in tension for a spring, and a contact force adjustment unit including a dog protruding upward a support bar to rotate the support bar; a nut disposed on an upper surface of the support bar, and configured to support the dog when the dog rotates; a wedge member inserted into an insertion hole while being screw-fastened to an outer surface of the support bar, and having an upper portion with a diameter that is gradually increased upward along the height direction so that the wedge member is seated in the installation hole; and a height adjustment unit for adjusting a height of the dog.

3 Claims, 9 Drawing Sheets

CONTACT FORCE ADJUSTMENT APPARATUS FOR CONTACT BAR CAPABLE OF ADJUSTING HEIGHT OF DOG

BACKGROUND OF THE INVENTION

1. Field of the Invention

The present technology relates to a contact force adjustment apparatus for a contact bar, which includes a height adjustment unit that varies a height of a dog detected by a photosensor and a tension checking unit capable of easily checking a change in tension for a spring regardless of a skill level of a worker.

2. Description of the Related Art

Electric vehicles that are traveled using electric power, such as subways and high-speed railways, move along planned rails and underground tunnels as a pollution-free public transportation.

A plurality of electric vehicles are connected and high-voltage power is supplied through a current collection pantograph to move the electric vehicles. However, this type of electric vehicle may move only along rails, so that free traveling is impossible.

To solve the above problem, electric vehicles have been developed in which electric motors are driven using power charged in a battery without generating exhaust fumes so that the electric vehicles may freely move at a sufficient acceleration force and traveling speed, and as technologies of the electric motors and batteries are developed, not only small passenger vehicles but also large buses that may be traveled by electric charging have been recently developed.

The small passenger vehicles are charged using household electricity, but the large buses are charged by high pressure and high current, so a separate charging station is provided for charging the large bus.

In such a charging station, charging is performed by bringing a contact bar connected to a current collector into contact with a plurality of charging terminals provided on an upper surface of the large bus. In this case, a spring is provided between the current collector and the contact bar such that the contact bar makes close contact with the charging terminal, and as the contact bar makes close contact with the charging terminal by the elasticity of the spring, the charging is performed.

However, when the spring provided between the current collector and the contact bar is repeatedly contracted and relaxed due to a load of a cable or over a long period of time, tension of the spring itself is decreased, so that the contact bar does not make closely contact with the charging terminal, thereby causing a problem that charging is not properly performed. In this case, in order to solve the problem, the spring has to be replaced with a new one, resulting in high maintenance costs.

To solve such a problem, the above-mentioned problem was solved through the 'contact force adjustment apparatus for a contact bar', which is disclosed in Korean Registered Patent No. 10-2561273 well-known by the applicant of the present invention as a related art.

That is, a worker visually checks a contact state between the contact bar and the charging terminal at a total of four locations by rotating a dog provided on a support bar on the support bar to adjust the tension of the spring and adjust the gap between the contact bar and the current collector.

However, in addition to the decrease in tension of the spring, the cause of a decrease in contact force mentioned as the conventional problem may be a decrease in contact force caused due to an inclination of the ground or a difference in air pressures of tires of the large bus. In this case, certain compensation is possible by the configuration of the related art, but compensation is impossible only by the configuration of the related art in the severely inclined ground.

That is, in the related art, a lifting height of the support bar is determined within a detection value of the photosensor in a process of rotating the dog to adjust the tension (extended or contracted degree) of the spring, so that at a time point when the lifting height exceeds the detection value, even though the support bar is further lifted down, activation required for the charging is not performed when the detection is not performed by the photosensor.

Furthermore, since the related art employs a method for visually identifying a change in tension of the spring according to twisting of the contact bar by a worker, so that a worker who lacks a skill level may not detect the change in tension of the spring.

SUMMARY OF THE INVENTION

1. Technical Problem

To solve the above conventional problem, an object of the present invention is to vary a height of a dog to be detected by a photosensor in a process of adjusting a contact force between a contact bar and a charging terminal by tension of a spring as a support bar is lifted down equal to or more than a detection value by the photosensor.

In addition, to solve the above-described another conventional problem, another object of the present invention is to allow a worker to easily identify a change in tension of a spring regardless of a skill level of the worker, and to use the present invention for uniformly adjusting a contact pressure of a plurality of contacts between a contact bar and a charging terminal.

2. Technical Solution

As the technical solution for solving the conventional problems described above, according to the present invention, there is provided a contact force adjustment apparatus of a contact bar capable of adjusting a height of a dog includes a contact force adjustment unit (500), in which the contact force adjustment unit (500) includes: a dog (510) protruding upward the support bar (200) to rotate the support bar (200); a nut (520) disposed on an upper surface of the support bar (200) while being screw-fastened to an outer surface of the dog (510), and configured to support the dog (510) when the dog (510) rotates; a wedge member (530) inserted into an installation hole (610) while being screw-fastened to an outer surface of the support bar (200), and having an upper portion with a diameter that is gradually increased upward along the height direction so that the wedge member is seated in the installation hole (610); and a height adjustment unit (540) for adjusting a height of the dog (510).

In addition, the height adjustment unit (540) is preferably any one of: a first height adjustment body (541) configured to vary the height of the dog (510) while being coupled to the outer surface of the dog (510) so as to be lifted up or down; or a second height adjustment body (543) configured to vary the height of the dog (510) according to a rotation direction while being rotatably screw-coupled to an inner surface of an insertion hole (511) formed in the dog (510).

In addition, the contact force adjustment unit (500) preferably further includes: a tension checking unit (800) for displaying a change in tension of a spring (400) and a contact pressure between the contact bar (100) and a charging terminal as a number, in which the tension checking unit (800) includes: a piezoelectric sensor (810) installed on a support plate (600) such that a detection pin (811) is pressed by the contact bar (100); and a counter (820) electrically connected to the piezoelectric sensor (810) to display a pressure applied to the detection pin (811) as a numerical value.

In addition, the piezoelectric sensor (810) is preferably configured to display the detection pin (811) to be always pressed by the contact bar (100) to display a reference value through the counter (820), and is preferably configured to confirm a state of the spring (400) according to an increase or decrease of the reference value in a state in which the contact bar (100) does not make contact with the charging terminal.

3. Advantageous Effects

According to the present invention, when an electric vehicle, which has a charging terminal unlike the related art, has an excessive inclination due to a ground state, a difference in air pressure, or the like, so as to rotate the support bar equal to or greater than the detection value of the photosensor, the detection of the photosensor is possible through the first height adjustment body or the second height adjustment body, so that it is possible to charge the electric vehicle having an excessive inclination.

In addition, unlike the related art, the worker may easily and visually grasp the state of each spring regardless of a skill level of the worker or the contact between the contact bar and the charging terminal, and a contact pressure at each contact point of the contact bar and the charging terminal may also be easily checked.

DETAILED DESCRIPTION OF THE INVENTION

Hereinafter, a contact force adjustment apparatus for a contact bar capable of adjusting a height of a dog (hereinafter simply referred to as an 'adjustment apparatus') according to the present invention will be described in detail with reference to the accompanying drawings.

Figure 1:
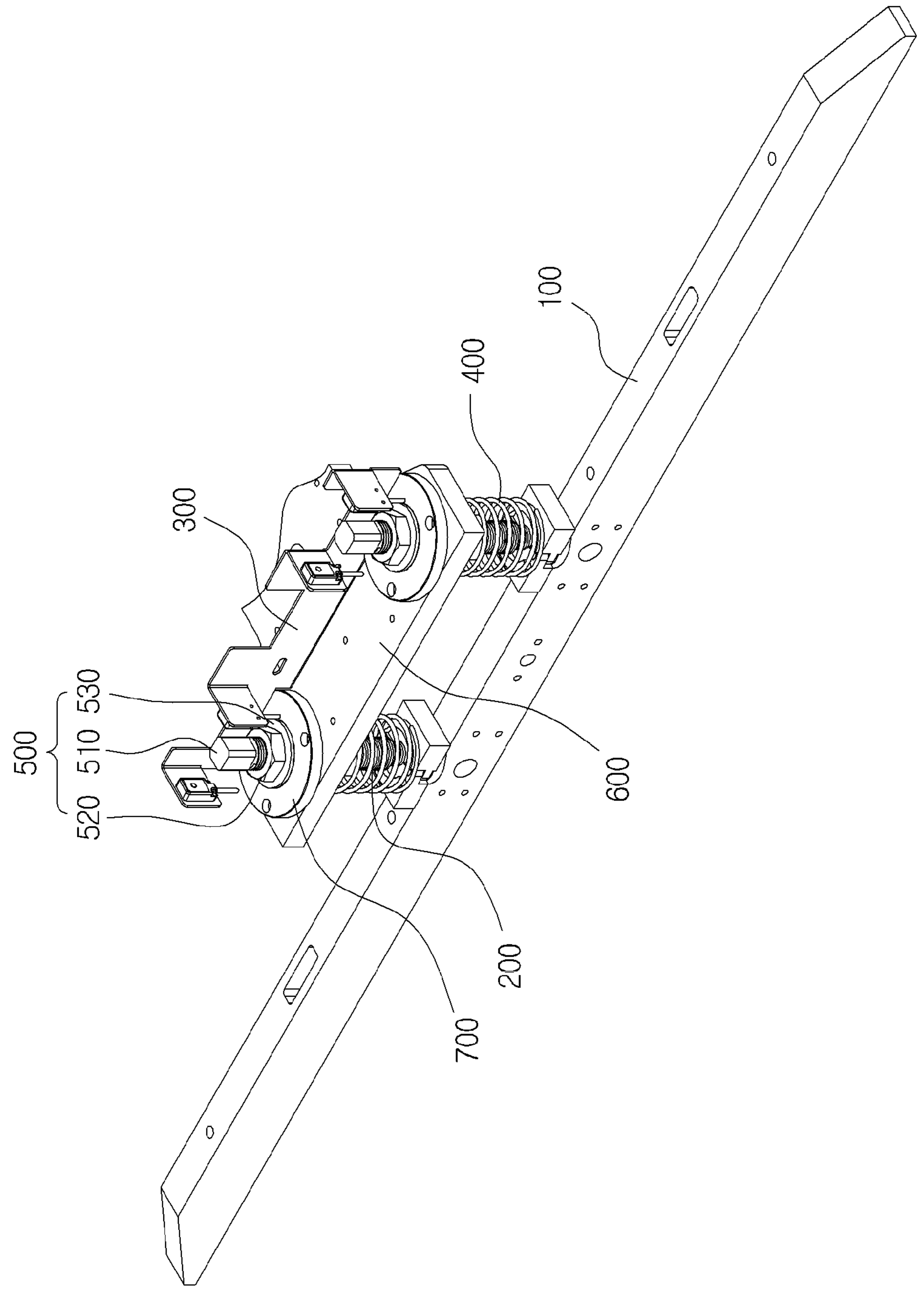
FIG. 1 is a view illustrating a conventional contact force adjustment apparatus for a contact bar.

Prior to the description, as compared with the 'contact force adjustment apparatus for a contact bar' disclosed in Korean Registered Patent No. 10-2561273 by the present applicant, since the adjustment apparatus according to the present invention further includes a height adjustment unit 540 provided on an upper portion of a dog 510 and a plurality of tension checking units 800 installed on an auxiliary support member 700 so as to detect a change in tension of a spring 400 that is elastically restored, it should be noted that detailed descriptions of a contact bar 100, a support bar 200, a current collector 300 a spring 400, a contact force adjustment unit 500, a support plate 600, and the auxiliary support member 700 are replaced with the technical contents that are known in Korean Registered Patent No. 10-2561273 (see FIG. 1).

Figure 2:
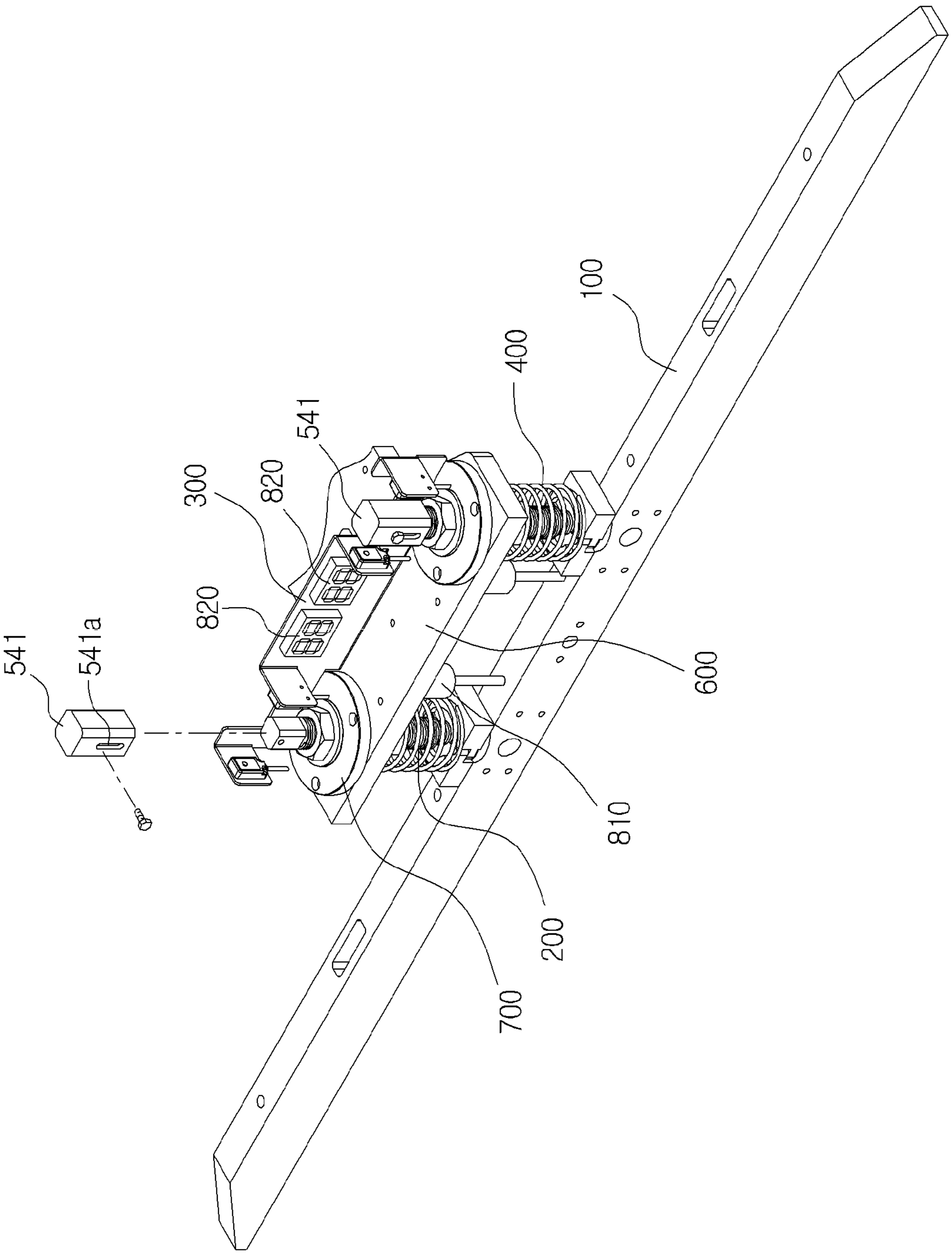
FIG. 2 is a view illustrating a contact force adjustment apparatus for a contact bar capable of adjusting a height of a dog according to the present invention.
Figure 3:
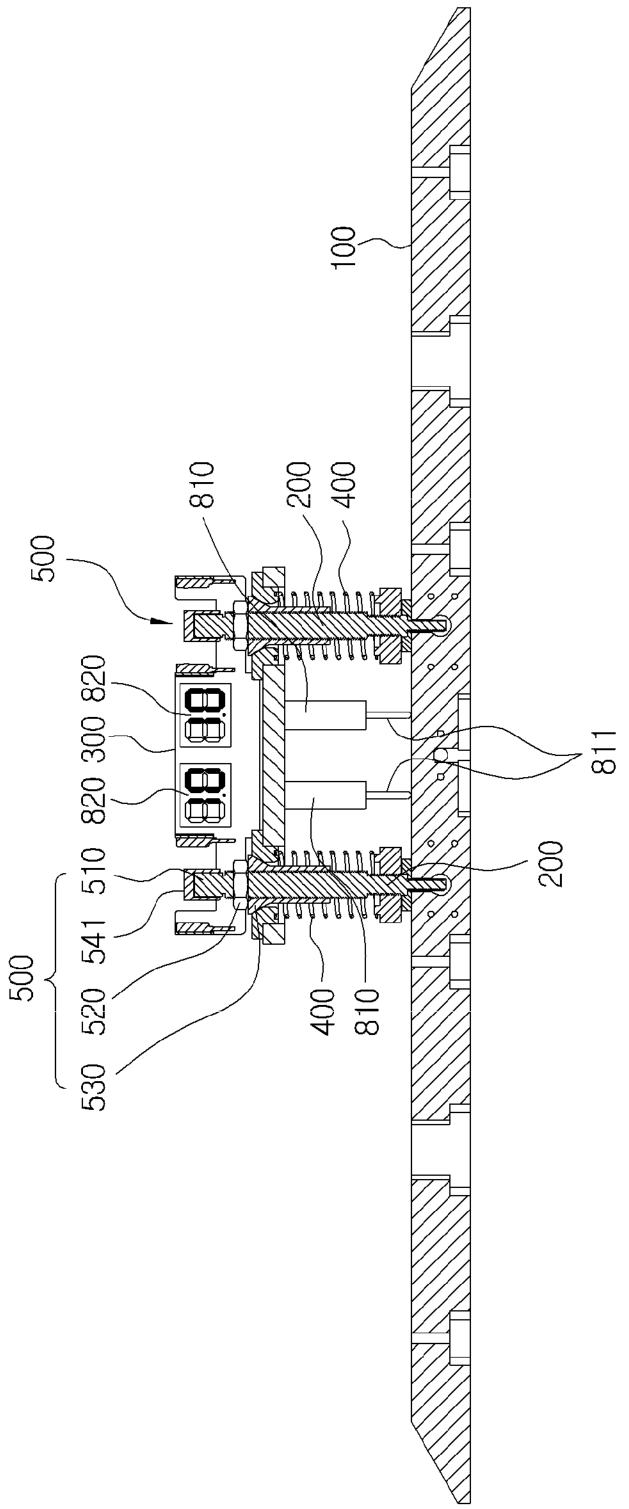
FIG. 3 is a sectional view of FIG. 2.

First, as illustrated in FIGS. 1 to 3, the adjustment apparatus according to the present invention further includes the height adjustment unit 540 provided on the dog 510 and the tension checking unit 800 mounted on the auxiliary support member 700 constituting the contact force adjustment unit 500, in addition to the contact bar 100, the support bar 200, the current collector 300, the spring 400, the contact force adjustment unit 500, the support plate 600, and the auxiliary support member 700.

Meanwhile, a reference numeral "540" not shown in the drawing means a height adjusting unit including first and second height adjustment bodies 541 and 543, and a reference numeral "800" means a tension adjustment unit including a piezoelectric sensor 810 and a counter 820.

In more detail, as illustrated in FIGS. 4 to 7, any one of the first height adjustment body 541 or the second height adjustment body 543 is applied and used according to each embodiment as a configuration for detecting the dog 510 through a photosensor 320 by varying a height of an upper end of the dog 510 in a case where the support bar 200 is necessarily lifted down by rotating the dog 510 equal to or greater than a detection value of the photosensor 320 when an inclination of the ground or an excessive inclination (for example, air pressure of tires) of an electric vehicle having a charging terminal that makes contact with the contact bar 100 occurs.

Figure 4:
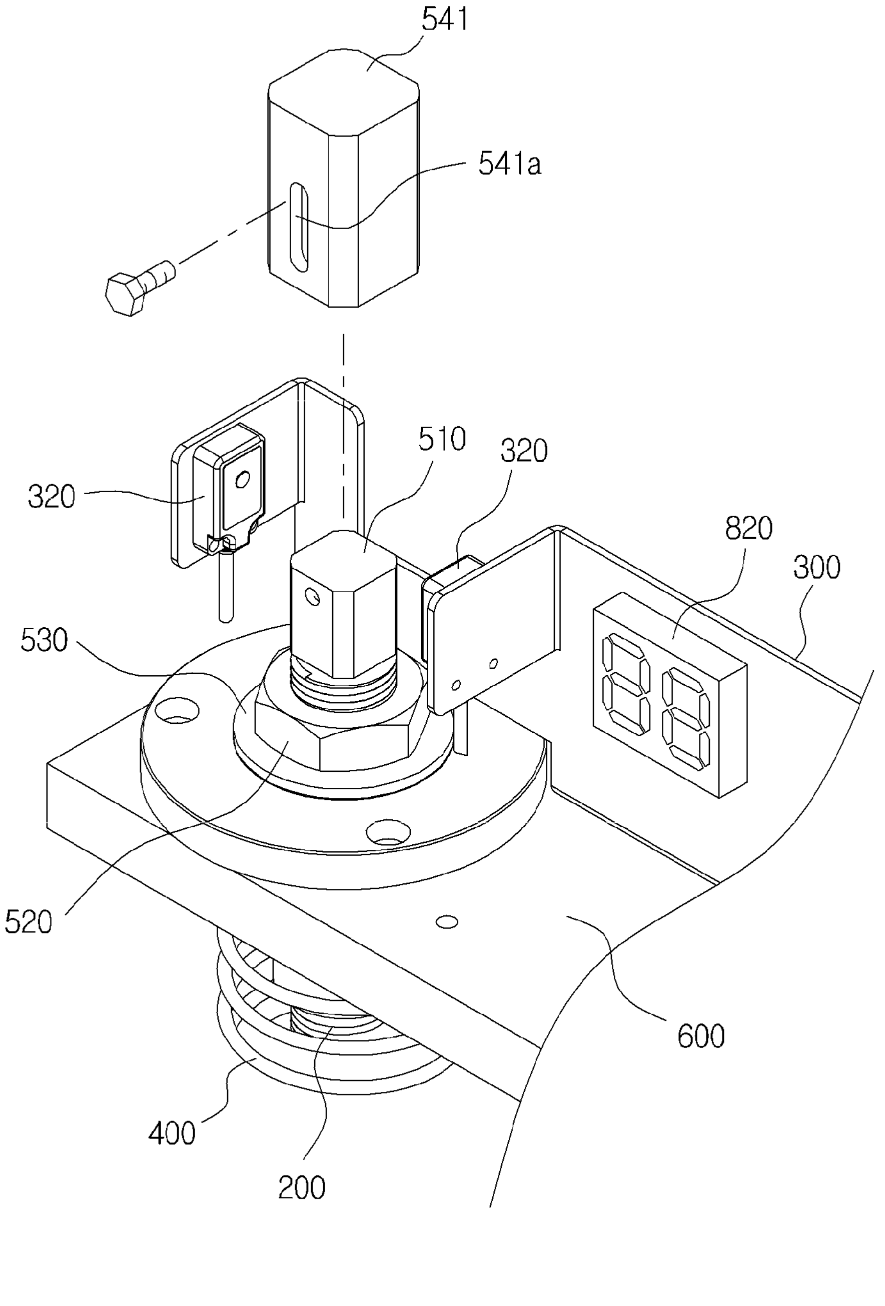
FIG. 4 is a view illustrating a first embodiment of a height adjustment unit for the contact force adjustment apparatus for a contact bar capable of adjusting a height of a dog according to the present invention.
Figure 5:
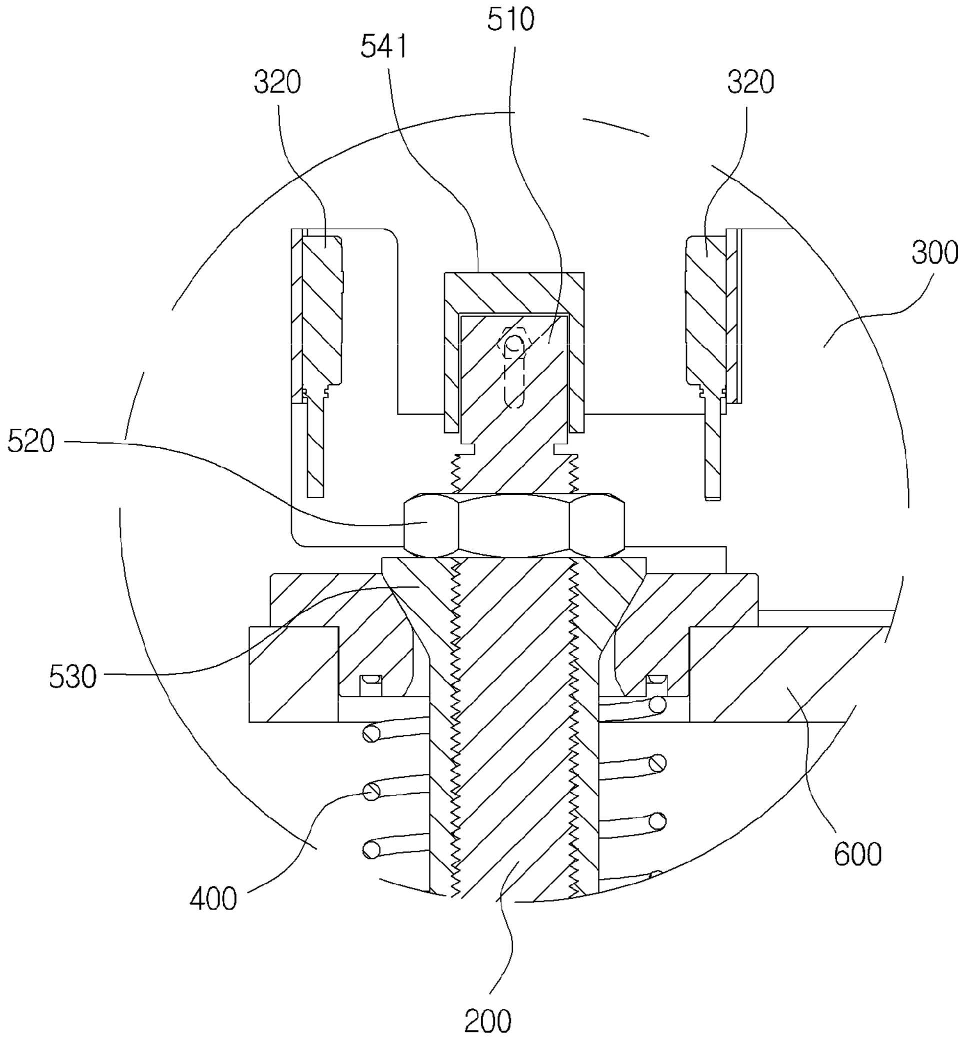
FIG. 5 is a sectional view of FIG. 4.

In this case, as illustrated in FIGS. 4 and 5, the first height adjustment body 541 is inserted into an outer surface of the dog 510 so as to be lifted up or down in order to vary the height of the dog 510, and presses and fixes the outer surface of the dog 510 after lifting up or down.

To this end, the first height adjustment body 541 is formed in a cap shape with an open lower portion, and has a fixing hole 541*a* which is formed in an outer surface thereof and into which a fixing bolt is inserted so that the first height adjustment body 541 is fixed to the outer surface of the dog 510 by pressing the outer surface of the dog 510.

In this case, as illustrated, the fixing hole 541*a* is preferably formed in a long hole shape with a length in a vertical direction so that the fixing bolt is fixed to the outer surface of the dog 510 according to variation of the height of the first height adjustment body 541.

Figure 6:
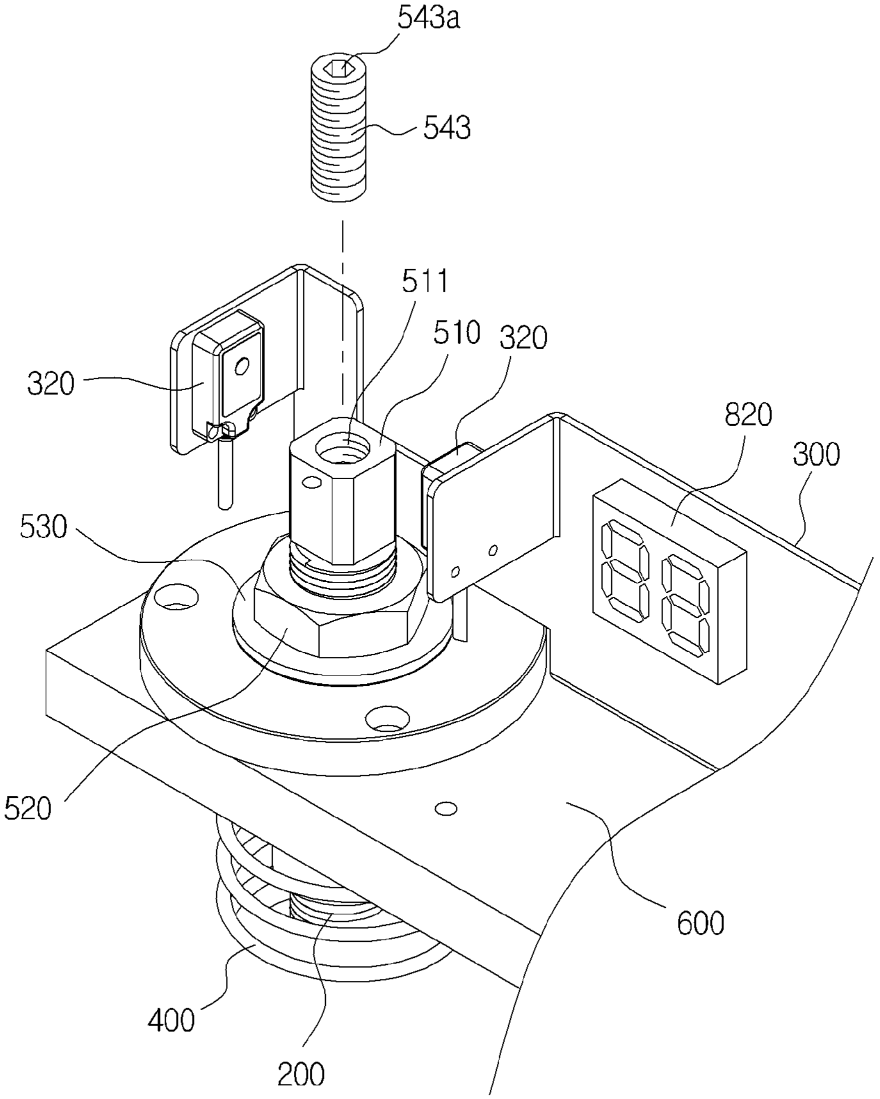
FIG. 6 is a view illustrating a second embodiment of the height adjustment unit for the contact force adjustment apparatus for a contact bar capable of adjusting a height of a dog according to the present invention.
Figure 7:
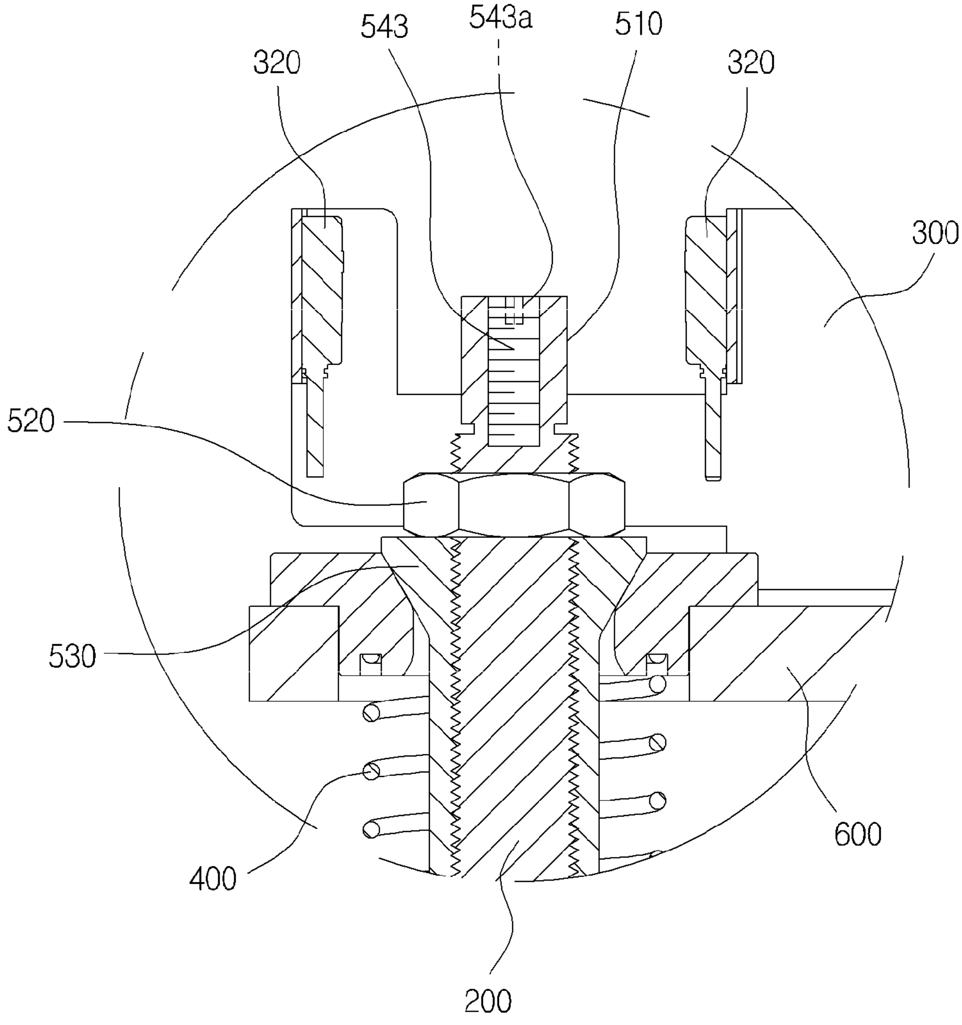
FIG. 7 is a sectional view of FIG. 6.

Meanwhile, as illustrated in FIGS. 6 and 7, the second height adjustment body 543 implements the same effect as the first height adjustment body 541, and is vertically led out from an inside to an outside of the dog 510, not from the outer surface of the dog 510.

To this end, as compared with the related art, the dog 510 has an insertion groove 511 extending downward from an upper end thereof and having a screw thread formed on an inner surface thereof, and the second height adjustment body 543 formed in a column shape is rotatably inserted into the insertion groove 511 so as to be screw-coupled thereto.

Furthermore, a tool groove is formed in an upper surface of the second height adjustment body 543 such that a worker easily lead out the second height adjustment body 543 to the outside of the dog 510 using a tool or the like.

Moreover, the second height adjustment body 543 screw-coupled to the insertion groove 511 is fastened in a direction opposite to a screw-coupling direction of the nut 520 or the wedge member 530 screw-coupled to the outer surface of the support bar 200, so that it is possible to prevent the support bar 200 from rotating together in the process of leading out the second height adjustment body 543 from the insertion groove 511 by rotation.

Therefore, any one of the first height adjustment body 541 or the second height adjustment body 543 is fastened to the dog 510 to change a height of the upper end of the dog 510 to be higher than that of the related art, so that a lifting-down length of the support bar 200 may be further increased with respect to the excessive inclination of the electric vehicle including the charging terminal, and in this process, detection of the photosensor 320 is possible, thereby easily implementing contact between the contact bar 100 and the charging member.

Figure 8:
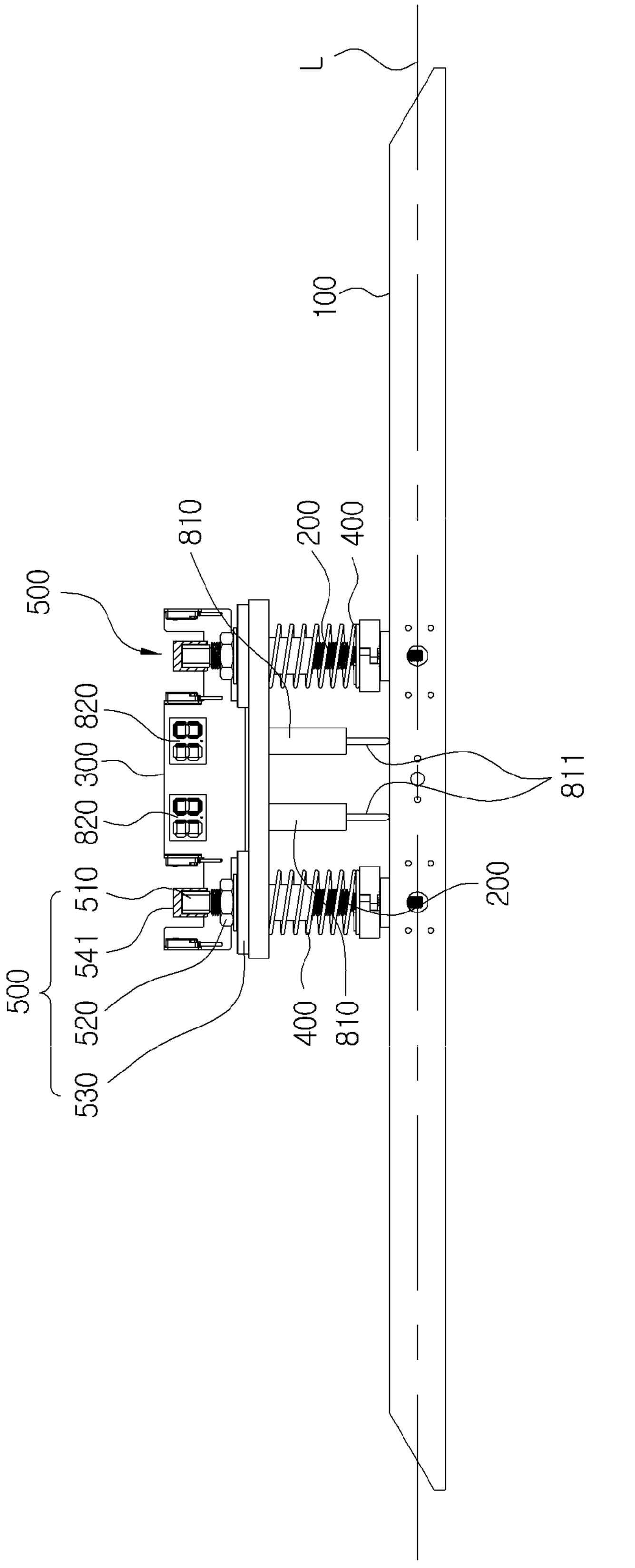
FIG. 8 is a view illustrating a tension checking unit when a contact bar is in a horizontal state for the contact force adjustment apparatus for a contact bar capable of adjusting a height of a dog according to the present invention.
Figure 9:
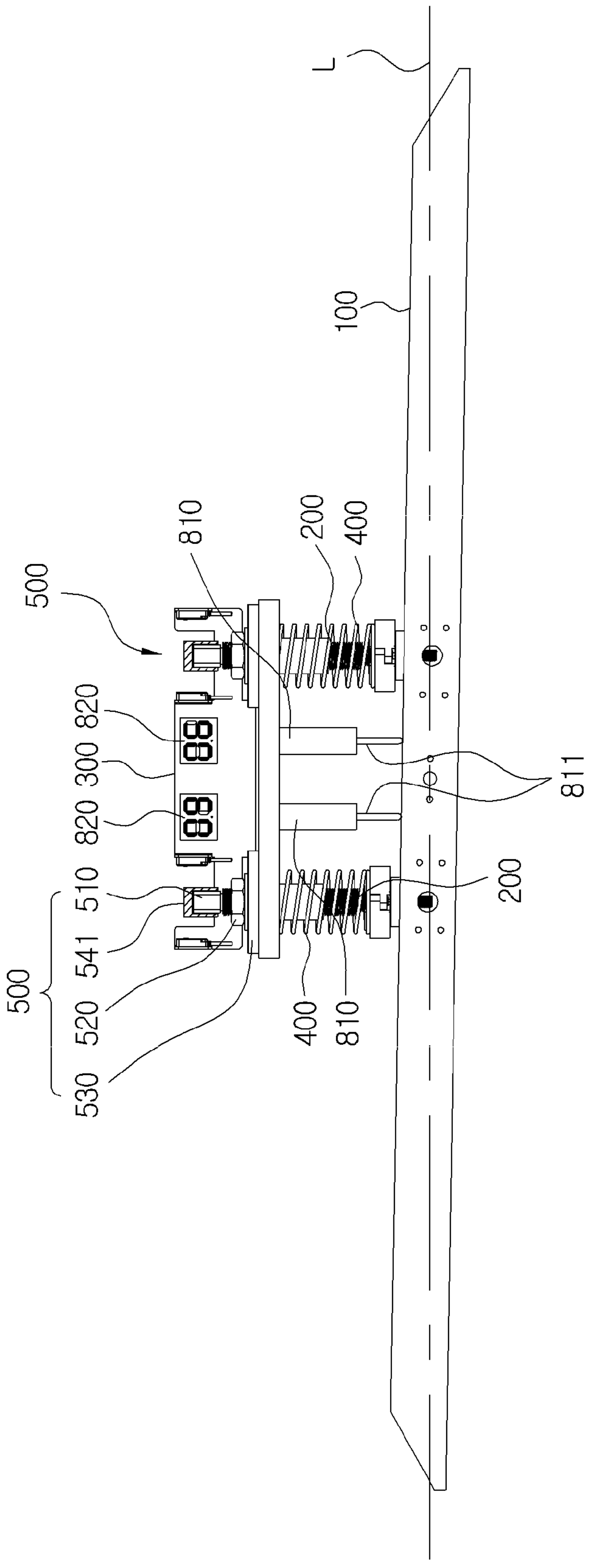
FIG. 9 is a view illustrating a tension checking unit when the contact bar is inclined for the contact force adjustment apparatus for a contact bar capable of adjusting a height of a dog according to the present invention.

In addition, as illustrated in FIGS. 3, 8, and 9, the tension checking unit 800 is a configuration for easily and visually checking a change in tension (extension or contraction) of the spring 400 regardless of a skill level of the worker or the contact between the contact bar 100 and the charging terminal, and includes the piezoelectric sensor 810 and the counter 820.

For example, as illustrated, the piezoelectric sensor 810 is installed corresponding to the number of springs 400 so as to be located on a lower surface of the support plate 600 facing an upper surface of the contact bar 100.

The columnar detection pin 811 protrudes from a lower portion of the piezoelectric sensor 810 so as to make contact with the contact bar 100, and transmits an electric signal, which is generated by varying different resistance values or the like according to a degree of pressurization of the contact bar 100 of the detection pin 811, to the piezoelectric sensor 810.

In addition, as illustrated, a plurality of counters 820 are provided on an outer surface of the current collector 300 so as to be electrically or separately connected to each piezoelectric sensor 810, and receive the electric signal transmitted to the piezoelectric sensor 810 through the detection pin 811 to numerically calculate the electric signal and display the electric signal.

Accordingly, the worker may easily and visually check the change in tension of each spring 400 without the contact between the contact bar 100 and the charging terminal regardless of a skill level of the worker, and numerical information numerically displayed through the counter 820 may be used to check a contact pressure generated at each contact point when the contact bar 100 makes contact with the charging terminal and has a function to check a pressure applied disproportionately to which contact point. As a result, the worker rotates the support bar 200 to adjust the tension of the spring 400.

In other words, in order to smooth determining the tension of the spring 400, as illustrated, in a state where the contact bar 100 is parallel to an arbitrary center line L and the contact bar 100 does not make contact with the charging terminal, the detection pin 811 of the piezoelectric sensor 810 presses the contact bar 100 at a predetermined pressure to set a state in which a numerical value (displayed as '1.0' in the drawing) displayed on each counter 820 as an initial state (see FIG. 8).

Thereafter, as illustrated in FIG. 9, as for the change in tension of the spring 400 (extended state), when the contact bar 100 deviates in any one direction, the contact pressure applied to the detection pin 811 is changed, and as a result, this change results in a change in numerical value displayed on the counter 820, so that the worker visually and easily grasps the state of the spring 400.

Obviously, when a plurality of contact points are obtained by bringing the contact bar 100 into contact with the charging terminal through the above method, the contact pressure applied to the detection pin 811 may also be checked through the numerical value displayed on the counter 820, so that the worker may uniformly apply each contact pressure by adjusting the support bar 200 in response to the numerical value.

As described above, in the adjustment apparatus according to the present invention, when an electric vehicle, which has a charging terminal unlike the related art, has an excessive inclination due to a ground state, a difference in air pressure of tires, or the like, so as to rotate the support bar 200 equal to or greater than the detection value of the photosensor 320, the detection of the photosensor 320 is possible through the first height adjustment body 541 or the second height adjustment body 543, so that it is possible to charge the electric vehicle having an excessive inclination.

In addition, unlike the related art, the worker may easily and visually grasp the state of each spring 400 regardless of a skill level of the worker or the contact between the contact bar 100 and the charging terminal, and a contact pressure at each contact point of the contact bar 100 and the charging terminal may also be easily checked.

What is claimed is:

1. A contact force adjustment apparatus for a contact bar of a pantograph, which comprises the apparatus comprising a contact force adjustment unit, wherein the contact force adjustment unit is provided on an upper surface of a support bar such that a current collector moves up and down along a height direction of the support bar as the support bar is rotated to adjust a gap between the contact bar and the current collector, thereby adjusting a contact force between the contact bar and a charging bar, wherein the contact force adjustment unit includes:

a dog protruding upward from the support bar to rotate the support bar;

a nut disposed on an upper surface of the support bar and fastened to an outer surface of the dog, and configured to support the dog when the dog rotates;

a wedge member inserted into an installation hole and fastened to an outer surface of the support bar, and having an upper portion with a diameter that is gradually increased upward along a height direction of the wedge member such that the wedge member is seated in the installation hole; and a height adjustment unit for adjusting a height of the dog, wherein the height adjustment unit includes one of:

a first height adjustment body coupled to the outer surface of the dog so as to be lifted up or down, thereby varying the height of the dog; or a second height adjustment body rotatably coupled to an inner surface of an insertion hole formed in the dog, thereby varying the height of the dog according to a rotation direction of the second height adjustment body.

2. A contact force adjustment apparatus for a contact bar of a pantograph, the apparatus comprising a contact force adjustment unit, wherein the contact force adjustment unit is provided on an upper surface of a support bar such that a current collector moves up and down along a height direction of the support bar as the support bar is rotated to adjust a gap between the contact bar and the current collector, thereby adjusting a contact force between the contact bar and a charging bar, wherein the contact force adjustment unit includes:

a dog protruding upward from the support bar to rotate the support bar;

a nut disposed on an upper surface of the support bar, fastened to an outer surface of the dog, and configured to support the dog when the dog rotates;

a wedge member inserted into an installation hole, fastened to an outer surface of the support bar, and having an upper portion with a diameter that is gradually increased upward along a height direction of the wedge member such that the wedge member is seated in the installation hole; and a height adjustment body for adjusting a height of the dog, wherein the contact force adjustment unit further includes:

a tension checking unit for numerically displaying a change in tension of a spring and a contact pressure between the contact bar and a charging terminal, and the tension checking unit includes: a piezoelectric sensor installed on a support plate, such that a detection pin is pressed by the contact bar; and a counter electrically connected to the piezoelectric sensor to numerically display a pressure applied to the detection pin.

3. The contact force adjustment apparatus of claim 2, wherein the piezoelectric sensor is configured to allow the detection pin to be constantly pressed by the contact bar to display a reference value through the counter, and is configured to confirm a state of the spring according to an increase or a decrease of the reference value in a state in which the contact bar does not make contact with the charging terminal.

* * * * *